United States Patent
Axelrod et al.

(10) Patent No.: US 7,464,031 B2
(45) Date of Patent: Dec. 9, 2008

(54) SPEECH RECOGNITION UTILIZING MULTITUDE OF SPEECH FEATURES

(75) Inventors: Scott E. Axelrod, Mount Kisco, NY (US); Sreeram Viswanath Balakrishnan, Los Altos, CA (US); Stanley F. Chen, Yorktown Heights, NY (US); Yuging Gao, Mount Kisco, NY (US); Ramesh A. Gopinath, Millwood, NY (US); Hong-Kwang Kuo, Pleasantville, NY (US); Benoit Maison, White Plains, NY (US); David Nahamoo, White Plains, NY (US); Michael Alan Picheny, White Plains, NY (US); George A. Saon, Old Greenwich, CT (US); Geoffrey G. Zweig, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/724,536

(22) Filed: Nov. 28, 2003

(65) Prior Publication Data

US 2005/0119885 A1 Jun. 2, 2005

(51) Int. Cl.
*G10L 15/00* (2006.01)
*G10L 15/20* (2006.01)
(52) U.S. Cl. .................. 704/236; 704/240; 704/251
(58) Field of Classification Search ............... 704/231, 704/234, 236, 239–240, 243, 251
See application file for complete search history.

(56) References Cited

U.S. PATENT DOCUMENTS 6,304,841 B1* 10/2001 Berger et al. ............... 704/2
6,456,969 B1* 9/2002 Beyerlein ............... 704/234
7,054,810 B2* 5/2006 Gao et al. ............... 704/231
7,324,927 B2* 1/2008 Weng et al. ............... 704/240
2003/0023438 A1* 1/2003 Schramm et al. ............ 704/240

FOREIGN PATENT DOCUMENTS

| JP | PUPA 07-56595 | 3/1995 |
| JP | PUPA 2001-511267 | 8/2001 |
| JP | PUPA 2003-022088 | 1/2003 |

OTHER PUBLICATIONS

Vergyri. "Integration of Multiple Knowledge Sources in Speech Recognition Using Minimum Error Training." PhD Thesis, Johns Hopkins University, 2000.*

(Continued)

*Primary Examiner*—James S Wozniak
(74) *Attorney, Agent, or Firm*—Douglas W. Cameron

(57) ABSTRACT

In a speech recognition system, the combination of a log-linear model with a multitude of speech features is provided to recognize unknown speech utterances. The speech recognition system models the posterior probability of linguistic units relevant to speech recognition using a log-linear model. The posterior model captures the probability of the linguistic unit given the observed speech features and the parameters of the posterior model. The posterior model may be determined using the probability of the word sequence hypotheses given a multitude of speech features. Log-linear models are used with features derived from sparse or incomplete data. The speech features that are utilized may include asynchronous, overlapping, and statistically non-independent speech features. Not all features used in training need to appear in testing/recognition.

12 Claims, 6 Drawing Sheets

OTHER PUBLICATIONS

Byrne et al, "Towards Language Independent Acoustic Modeling", IEEE Workshop on Automatic Speech Recognition and Understanding, 1999.*

Shimodaira. "A new criterion for selecting models from partially observed data." In: Cheeseman, P., Oldford, R.W. (Eds.), Selecting Models from Data: AI and Statistics IV. Springer, Berlin, 1994, pp. 21-30.*

Kirchhoff, "Combining articulatory and acoustic information for speech recognition in noisy and reverberant environ-ments," Proc. Int. Conf. on Spoken Language Proc., 1998, pp. 891-894.*

P. Beyerlein, "Discriminative Model Combination", 1997 IEEE, p. 238-245.

D. Vergyri, "Use of Word Level Side Information to Improve Speech Recognition", 2000 IEEE, vol. 3, p. 1823-1826.

* cited by examiner

SPEECH RECOGNITION UTILIZING MULTITUDE OF SPEECH FEATURES

This invention was made with Government support under grant contract number N66001-99-2-8916 awarded by the DARPA-BABYLON. The Government has certain rights in this invention

FIELD OF THE INVENTION

The present invention relates generally to a speech recognition system, and more particularly, to a speech recognition system that utilizes a multitude of speech features with a log-linear model.

BACKGROUND

Speech recognition systems are used to identify word sequences from unknown speech utterance. In an exemplary speech recognition system, speech features such as cepstra and delta cepstra features are extracted from the unknown utterance by a feature extractor to characterize the unknown utterance. A search is then done to compare the extracted features of the unknown utterance to models of speech units (such as phrases, words, syllables, phonemes, sub-phones, etc.) to compute the scores or probabilities of different word sequence hypotheses. Typically the search space is restricted by pruning out unlikely hypotheses. The word sequence associated with the highest score or likelihood, or probability, is recognized as the unknown utterance. In addition to the acoustic model, a language model that determines the relative likelihood of different word sequences is also used in the calculation of the overall score of the word sequence hypotheses.

Through a training operation, the parameters for the speech recognition models are determined. The speech recognition models may be used to model speech as a sequence of acoustic features, or observations produced by an unobservable "true" state sequence of sub-phones, phonemes, syllables, words, phrases, and the like. Model parameters output from the training operation are often estimated to maximize the likelihood of the training observations. The optimum set of parameters for speech recognition is determined by maximizing the likelihood on the training data. The speech recognition system determines the word sequence with the maximum posterior probability given the observed speech signal to recognize the unknown speech utterance. The best word sequence hypothesis is determined through the search process that considers the scores of all possible hypotheses within the search space.

SUMMARY OF THE INVENTION

In accordance with the exemplary aspects of this invention, a speech recognition system is provided.

In accordance with the various exemplary aspects of this invention, the combination of a log-linear model with a multitude of speech features is provided to recognize unknown speech utterances.

In accordance with various exemplary aspects of this invention, the speech recognition system models the posterior probability of a hypothesis, that is, the conditional probability of a sequence of linguistic units given the observed speech signal and possibly other information, using a log-linear model.

In accordance with these exemplary aspects, the posterior model captures the probability of the sequence of linguistic units given the observed speech features and the parameters of the posterior model.

In accordance with these exemplary aspects of this invention, the posterior model may be determined using the probability of the word sequence hypotheses given a multitude of speech features. That is, in accordance with these exemplary aspects, the probability of word sequence with timing information and labels, given a multitude of speech features, are used to determine the posterior model.

In accordance with the various exemplary aspects of this invention, the speech features that are utilized may include asynchronous, overlapping, and statistically non-independent speech features.

In accordance with the various exemplary aspects of this invention, log-linear models are used wherein parameters may be trained with sparse or incomplete training data.

In accordance with the various exemplary aspects of this invention, not all features used in training need to appear in testing/recognition.

DETAILED DESCRIPTION OF THE INVENTION

Figure 1:
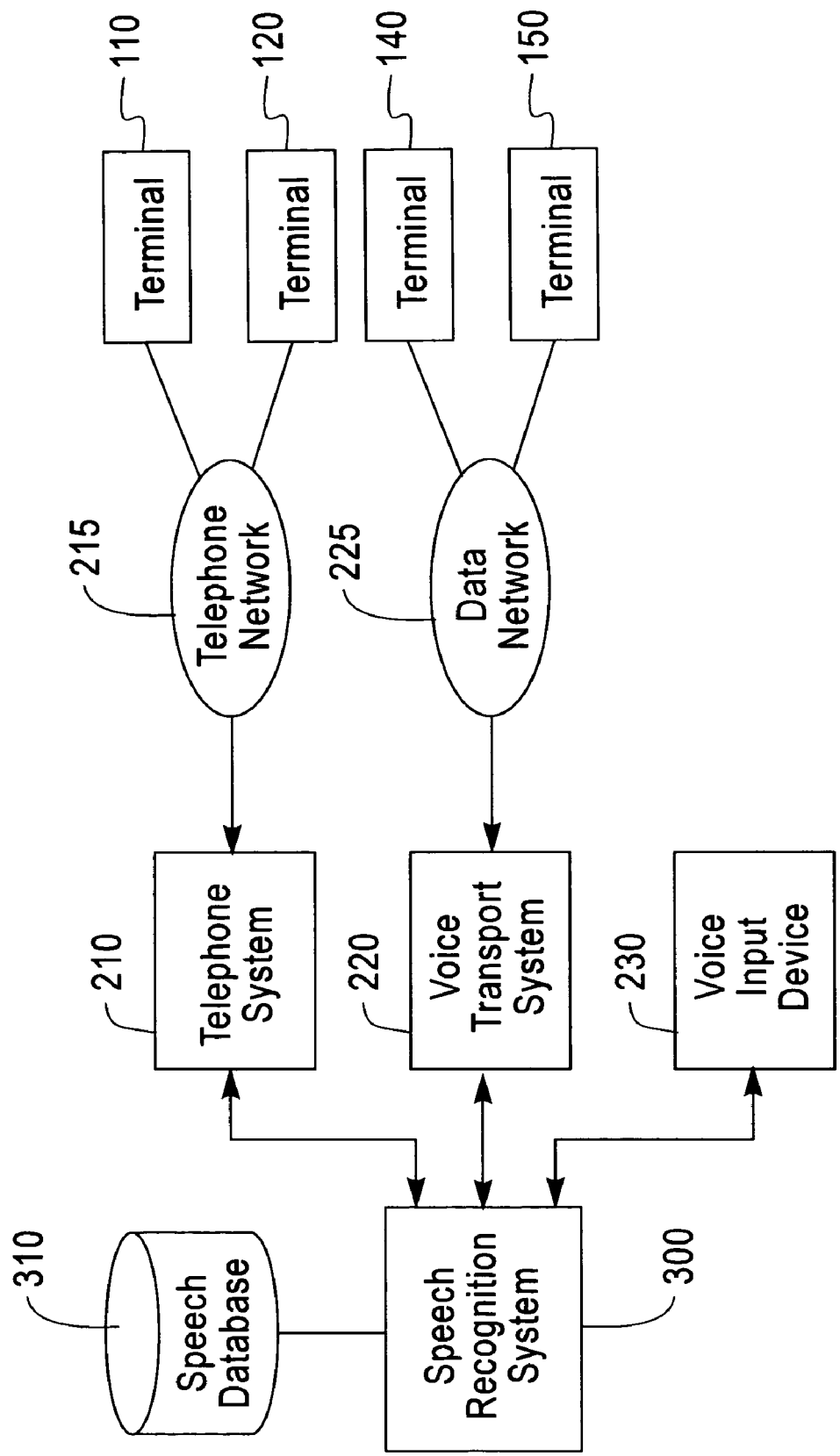
FIG. 1 shows an exemplary speech processing system embodying the exemplary aspects of the present invention.

The following description details how exemplary aspects of the present invention are employed. Throughout the description of the invention, reference is made to FIGS. 1-6. When referring to the figures, like structures and elements shown throughout are indicated with like reference numerals.

DESCRIPTION OF THE PREFERRED EMBODIMENTS

In FIG. 1, an exemplary speech processing system 1000 embodying the exemplary aspects of the present invention is shown. It is initially noted that the speech processing system 1000 of FIG. 1 is presented for illustration purposes only, and is representative of countless configurations in which the exemplary aspects of the present invention may be implemented. Thus, the present invention should not be considered limited to the system configuration shown in the figure.

As shown in FIG. 1, the speech processing system 1000 includes a telephone system 210, a voice transport system 220, a voice input device 230, and a server 300. Terminals 110-120 are connected to telephone system 210 via telephone network 215 and terminals 140-150 are connected to voice transport system 220 via data network 225. As shown in FIG. 1, telephone system 210, voice transport system 220, and voice input device 230 are connected to speech recognition system 300. The speech recognition system 300 is also connected to a speech database 310.

In operation, speech is sent from a remote user over network 215 or 225 through one of terminals 110-150, or directly from voice input device 230. In response to the input speech, terminals 110-150 run a variety of speech recognition and terminal applications.

The speech recognition system 300 receives the input speech and provides the speech recognition results to the inputting terminal or device.

The speech recognition system 300 may include or may be connected to a speech database 310 which includes training data, speech models, meta-data, speech data and their true transcription, language and pronunciation models, application specific data, speaker information, various types of models and parameters, and the like. The speech recognition system 300 then provides the optimal word sequence as the recognition output or it may provide a lattice of word sequence hypotheses with corresponding confidence scores. In accordance with the various exemplary aspects of this invention, lattices may have a plurality of embodiments including a summary of set of hypothesis by a graph which may have complex topology. It should be appreciated that if the graph contains loops, the set of hypothesis may be infinite.

As discussed above, though the exemplary embodiment above describes speech processing system 1000 in a particular embodiment, the speech processing system 1000 may be any system known in the art for speech processing. Thus, it is contemplated that the speech processing system 1000 may be configured and may include various topologies and protocols known to those skilled in the art.

For example, it is to be appreciated that though FIG. 1 only shows 2 terminals and one voice input device, the various exemplary aspects of the present invention is not limited to any particular number of terminals and input devices. Thus, it is contemplated that any number of terminals and input devices may be applied in the present invention.

Figure 2:
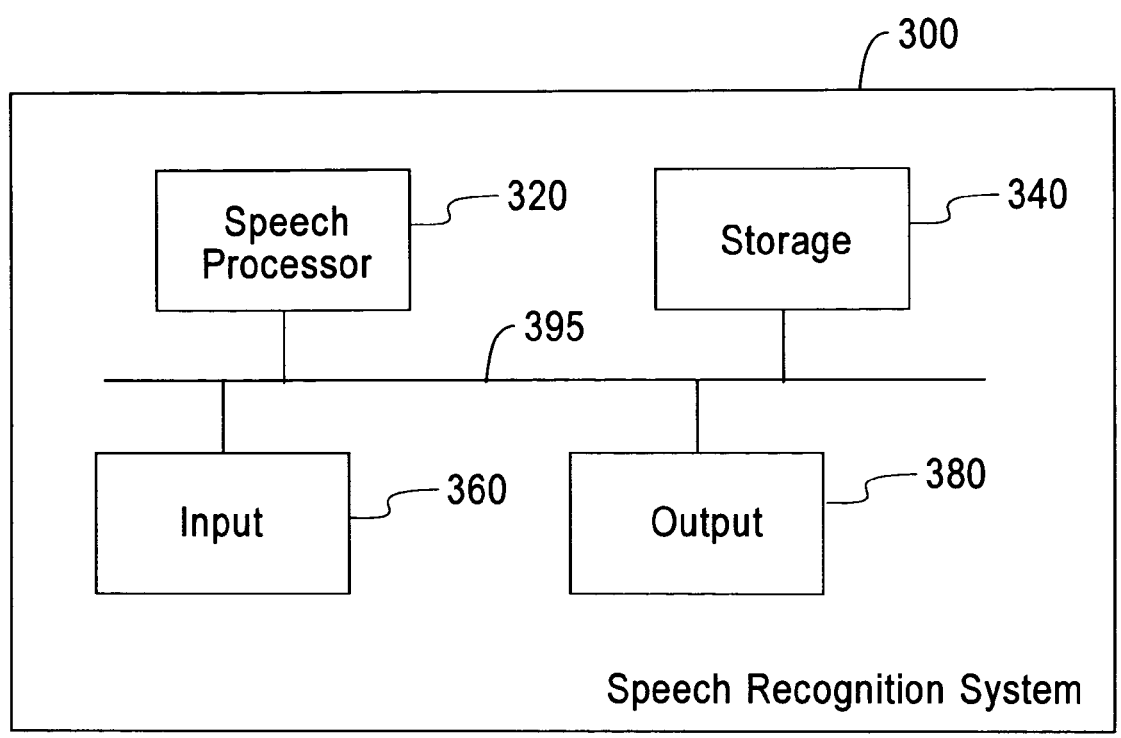
FIG. 2 shows an exemplary speech recognition system embodying the exemplary aspects of the present invention.

FIG. 2 shows an exemplary speech recognition system 300 embodying the exemplary aspects of the present invention. As shown in FIG. 2, the speech recognition system 300 includes a speech processor 320, a storage device 340, an input device 360 and an output device 380, all connected by bus 395.

In operation, the processor 320 of speech recognition system 300 receives the incoming speech data comprising unknown utterance, meta-data, such as caller ID, speaker gender, channel conditions, and the like, from a user at a terminal 110-150 or voice input device 230 through the input device 360. The speech processor 320 then performs the speech recognition based on the appropriate models stored in the storage device 340, or received from the database 310 through the input device 360. The speech processor 320 then routes the recognition results to the user at the requesting terminal 110-150 or voice input device 230 or a computer agent (that may perform actions appropriate to what the user said) through output device 380.

Although FIG. 2 shows a particular form of speech recognition system, it should be understood that other layouts are possible and that the various aspects of the invention are not limited to such layout.

In the above exemplary embodiment, the speech processor 320 may provide recognition results based on data stored in memory 340 or the database 310. However, it is to be appreciated that the various exemplary aspects of the present invention are not limited to such layout.

Figure 3:
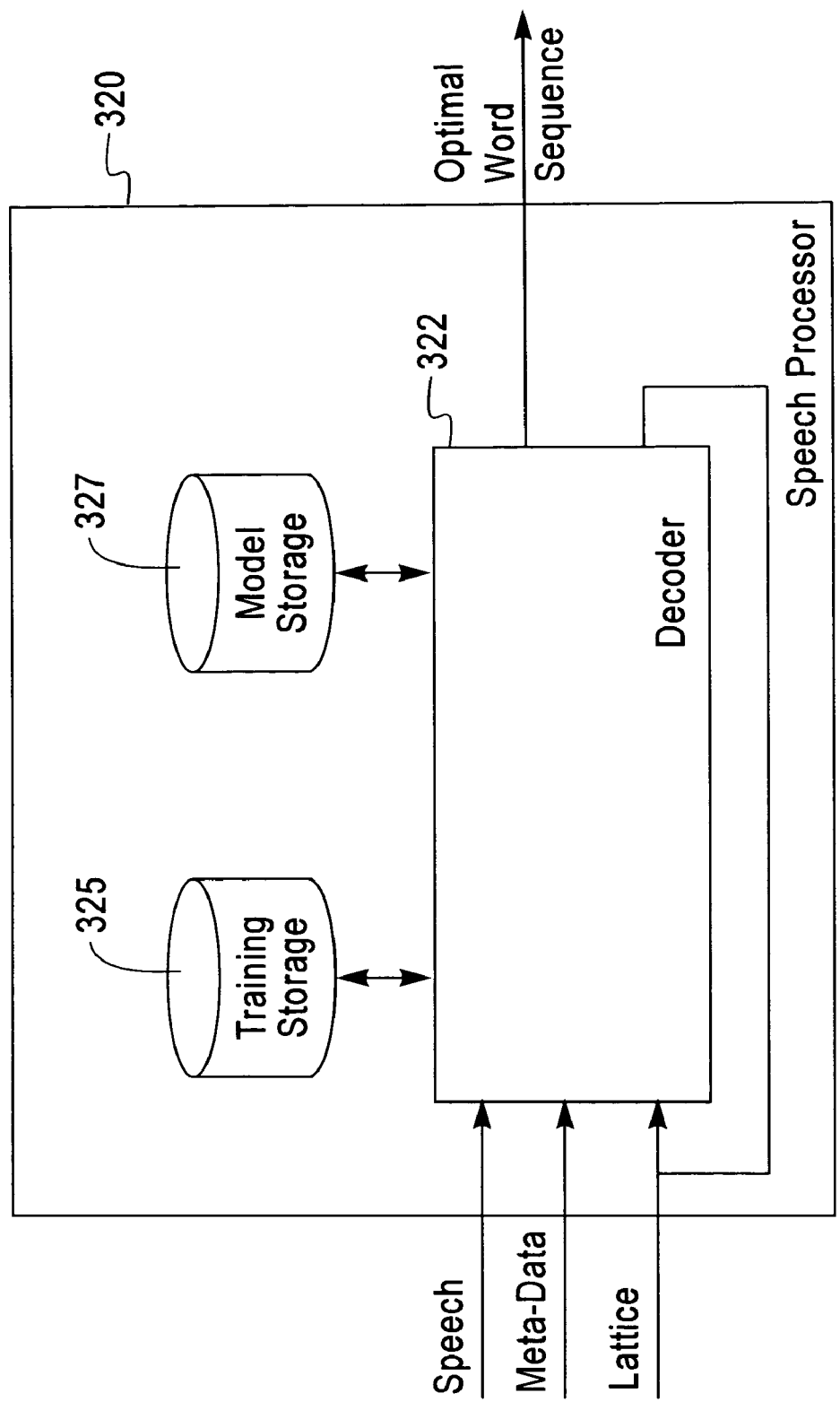
FIG. 3 shows an exemplary speech processor embodying the exemplary aspects of the present invention.

FIG. 3 shows an exemplary speech processor 320 embodying the exemplary aspects of the present invention. As shown in FIG. 3, the speech processor 320 includes a decoder 322 which utilizes the posterior probability of linguistic units relevant to speech recognition using a log-linear model to provide the recognition of the unknown utterance. That is, from the probabilities determined, the decoder 322 determines the optimal word sequence that has the highest probability, and output the word sequence as the recognized output. The decoder may prune the lattice of possible hypotheses to restrict the search space and reduce computation time.

The decoder 322 is further connected to a training storage 325 which stores speech data and their true transcriptions for training, and a model storage 327 that stores model parameters obtained from the training operation.

Figure 4:
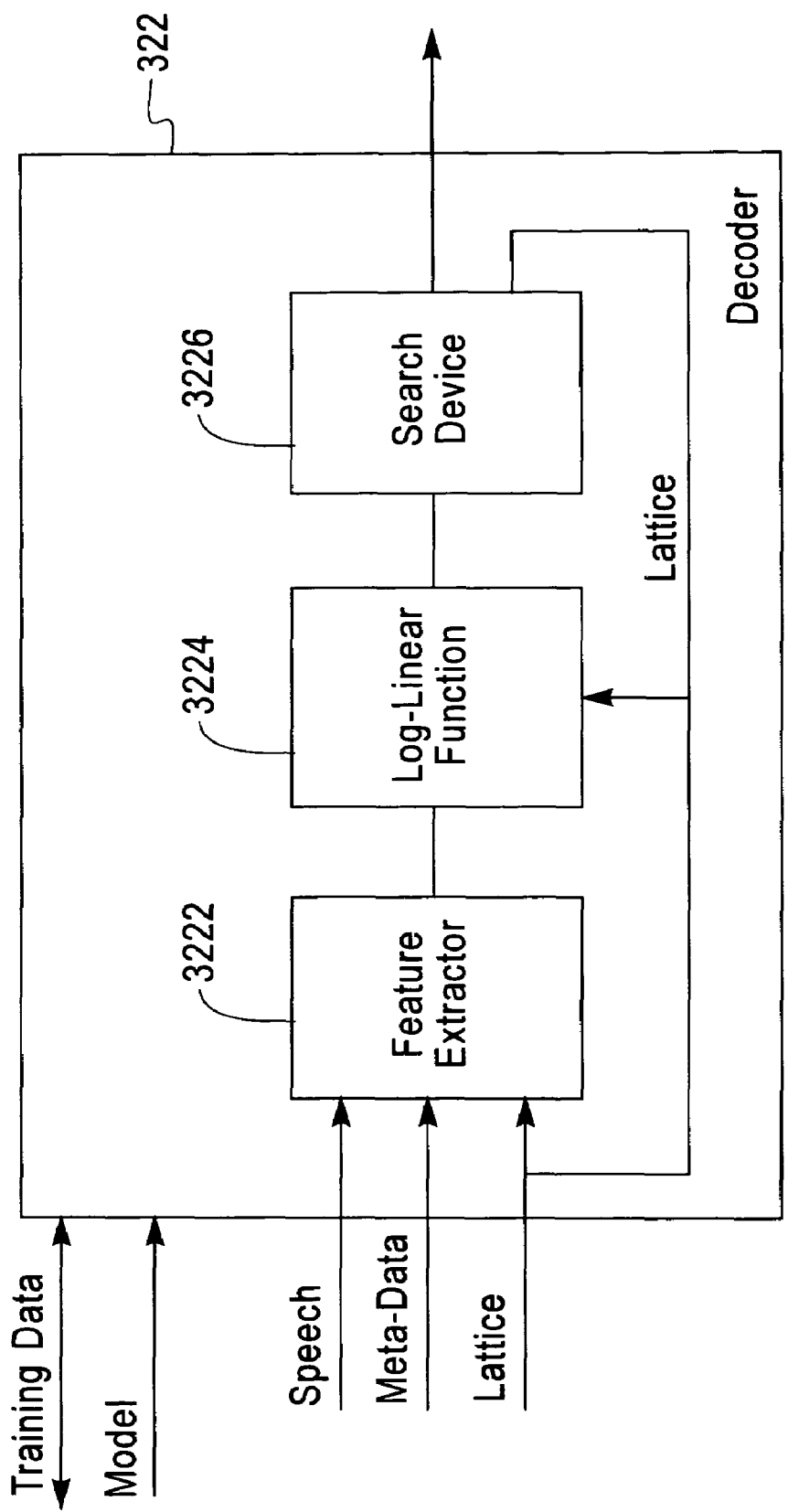
FIG. 4 shows an exemplary decoder embodying the exemplary aspects of the present invention.

FIG. 4 shows the decoder of FIG. 3 in further detail. As shown in FIG. 4, the decoder 322 includes a features extractor 3222, a log-linear function 3224, and a search device 3226.

In operation, during the training operation, training data is input to the decoder 322 along with the true word transcription from the training storage 325, where the model parameters are generated and output to the model storage 327, to be used during the speech recognition operation. During the speech recognition operation, unknown speech data is input to the decoder 322 along with the model parameters stored in the model storage 327 during the training operation, and the optimal word sequence is output.

As shown in FIGS. 3-4, during the training operation, training data is input to the feature extractor 3222 along with the meta-data, and the truth from the truth element 325 which can consist of the true transcriptions, which are typically words, but can also be other linguistic units like phrases, syllables, phonemes, acoustic phonetic features, sub-phones, and the like, and possibly but not necessarily time alignments for matching the linguistic units in the true transcription with the corresponding segments of speech. That is, the training operation is performed to determine the maximum likelihood of truth. The feature extractor 3222 extracts a multitude of features from the input data using a multitude of extracting elements. It should be appreciated that the features may be advantageously asynchronous, overlapping, statistically non-independent, and the like, in accordance to the various exemplary aspects of this invention. The extracting elements include, but are not limited to, direct matching element, synchronous phonetic element, acoustic phonetic element, linguistic semantic pragmatic features element, and the like.

For example, the exemplary direct matching element may compute a dynamic time warping score against various reference speech segments in the database. Synchronous phonetic features can be derived from traditional features like mel cepstra features. Acoustic phonetic features can be asynchronous features that include linguistic distinctive features such as voicing, place of articulation, and the like.

It should be appreciated that, in accordance with the various exemplary embodiments of this invention, none of these feature extractors need to be perfectly accurate. Features can also include higher level information extracted from a particular word sequence hypothesis, for example, from a semantic or syntactic parse tree, the pragmatic or semantic coherence, and the like. Features can also be meta-data such as speaker information, speaking rate, channel condition, and the like.

The multitude of extracted features are then provided to a log-linear function 3224, which, using the parameters of the log-linear model, can compute the posterior probability of a hypothesized linguistic unit or sequence, given the extracted features and possibly a particular time alignment of the linguistic units to speech data.

During the training process, the correct word sequence is known, for example, the correct sequence is created by humans transcribing the speech. However, there may be multiple valid choices of linguistic units, for example, phonemes, that make up the word sequence due to pronunciation variants and the like. All the valid sequences may be compactly represented as a lattice. In addition, the true time alignment any particular unit sequence to the speech may or may not be known. The trainer (not shown in diagram) uses the extracted features, the correct word sequence, or linguistic unit sequence, with possibly time alignments to the speech, and optimizes the parameters of the log-linear model.

Thus, during training, the log-linear output may be provided to the search device 3225 which can refine and provide a better linguistic unit sequence choice and a more accurate time alignment of the linguistic unit sequence to the speech. This new alignment may then be looped back to the feature extractor 3222 as FEEDBACK to repeat the process for a second time to optimize the model parameters. It should be appreciated that the initial time alignment may be bootstrapped by human annotation or by hidden Markov model technology. Thus, the model parameters corresponding to the maximum likelihood are determined as the training model parameters, and are sent to the model data element 327, where they are stored for the subsequent speech recognition operations.

In various exemplary embodiments of the present invention, the log linear models are trained using any one of several algorithms, including improved iterative scaling, iterative scaling, preconditioned conjugate gradient, and the like. The training results in optimizing the parameters of the model in terms of some criterion such as maximum likelihood or maximum entropy subject to some constraints. The training is performed by a trainer (not shown) that uses the features provided by the features extractor, the correct linguistic unit sequence and the corresponding time alignment to the speech.

In an exemplary embodiment, preprocessing by a state-of-the-art hidden Markov model recognition system (not shown in figures) to extract the features and to align the target unit sequences. For example, the hidden Markov model may be used to align the speech frames to optimal sub-phone state sequences, and determine the top ranked Gaussians. That is, within the hidden Markov model, the Gaussian probability models of traditional features such as mel cepstra features that are the best match to the speech frame pre-determined. In this exemplary embodiment, sub-phone state sequences and the ranked Gaussian data are features used to train the log linear model.

It should be understood that this exemplary embodiment is only one specific implementation, and that many other embodiments of training using log linear models may be used in the various aspects of this invention.

During the speech recognition operation, speech data to be recognized is input to the feature extractor 3222 along with the meta-data, and possibly a lattice that comprises the current search space of the search device 3226. This lattice may be pre-generated by well known technology based on hidden Markov models, or may be generated on a previous round of recognition. The lattice is a compact representation of the current set of scores/probabilities of various possible hypotheses considered within the search space. The feature extractor 3222 then extracts a multitude of features from the input data using a multitude of extracting elements. It should be appreciated that the features may be asynchronous, overlapping, statistically non-independent, and the like, in accordance to the various exemplary aspects of this invention. The extracting elements, include, but are not limited to, direct matching element, synchronous phonetic element, acoustic phonetic element, linguistic semantic pragmatic features element, and the like. The multitude of extracted features are then provided to a log-linear function 3224.

The search device 3226 is provided to determine the optimal word sequence of all possible word sequences. In an exemplary embodiment, the search device 3226 limits the search to the most promising candidates by pruning out unlikely word sequences. The search device 3226 consults the log-linear function 3224 about the likelihood of entire or partial word or other unit sequences. The search space considered by the search device 3226 may be represented as a lattice that is a compact representation of the hypotheses under active consideration, along with the scores/probabilities. Such a lattice may be an input to the search device, constraining the search space, or an output after work has been done by the search device 3226 to update the probabilities in the lattice or pruning out unlikely paths. The search device 3226 may also advantageously combine the probabilities/scores from the log-linear function 3224 with probabilities/scores from other models such as language model, hidden Markov model, and the like in a non-log-linear fashion such as linear interpolation after dynamic range compensation. However, language model and hidden Markov model information may also be considered features that are combined in the log-linear function 3224.

The output of the search device 3226 is an optimal word sequence with the highest posterior probability among all the hypotheses in the search space. The output may also output a highly pruned lattice, of which an N-best list may be an example, of highly likely hypotheses that may be utilized by a computer agent to take further action. The search device 3226 may also output a lattice with updated scores and possibly alignments that can be fed back into the feature extractor 3222 and log-linear function 3224 to refine the scores/probabilities. It should be appreciated that, in accordance with the various exemplary embodiments of this invention, this last step may be optional.

As discussed in the above exemplary embodiments, in the speech recognition system of the exemplary aspects of this invention, there are many possible word sequences in the search space consisting theoretically of any sequence of words in the vocabulary, so that an efficient search operation is performed by the decoder 322 to obtain the optimal word sequence. It should be appreciated that, as shown by the feedback loop in FIG. 4, a single-pass decoding or mulitple-pass decoding may be applied, where a lattice, or list of top hypotheses, may be generated in the first pass using a crude model and may be looped back and rescored using the more refined model in a subsequent pass.

In the multiple-pass decoding, the probability of each of the word sequences in the lattice is evaluated. The probability of each specific word sequence may be related to the probability of the best alignment of its constituent sub-phone state sequence. It should be appreciated that the optimally aligned state sequence may be found in any variety of alignment process in accordance with the various embodiments of this invention, and that this invention is not limited to any particular alignment.

Selecting the word sequence with the highest probability is done using the new model to perform word recognition.

It should be appreciated that, in accordance with the various exemplary embodiments of this invention, the probabilities from various models may be combined heuristically with the probability from the log linear model of the various exemplary embodiments of this invention. In particular, a multiple of scores may be combined, including the traditional hidden Markov model likelihood score, and the language model score, through linear interpolation after dynamic range compensation, with the probability score from the log linear model of the various exemplary embodiments of this invention.

In accordance with the various exemplary embodiments of this invention, the search device 3226 consults the log-linear function 3224 repeatedly in determining the scores/probabilities of different sequences. The lattice is consulted by the search device 3226 to determine what hypothesis to consider. Each path in the lattice corresponds to a word sequence and has an associated probability stored in the lattice.

In the above-described exemplary embodiments of the present invention, the log linear models are determined based on the posterior probability of a hypothesis given a multitude of speech features. The log linear model allows for the potential combination of multiple features in a unified fashion. For example, asynchronous and overlapping features may be incorporated formally.

As a simple example, the posterior probability may be represented as the probability of a sequence associated with a hypothesis given a sequence of acoustic observations:

$$P(H_j | \text{features}) = P(w_1^k | o_1^T) = \prod_{i=1}^{k} P(w_i | w_1^{i-1}, o_1^T), \quad (1)$$

where:
$H_j$ is the jth hypothesis that contains a sequence of word (or other linguist unit) sequence $w_1^k = w1w2 \ldots wk$
 i is the index pointing to the ith word (or unit)
 k is the number of words (units) in the hypothesis
 T is the length of the speech signal (e.g. number of frames)
 $w_j^k$ is the sequence of words associated with the hypothesis $H_j$, and
 $o_l^T$ is the sequence of acoustic observations.

In the above equation (1), the conditional probabilities may be represented by a maximum entropy log-linear model:

$$P(w_i | w_1^{i-1}, o_1^T) = \frac{e^{\sum_j \lambda_j f_j(w_i, w_1^{i-1}, o_1^T)}}{Z(w_1^{i-1}, o_1^T)}, \quad (2)$$

where:
$\lambda_1$ are the parameters of the log-linear model,
$f_1$ are the multitude of features extracted, and
Z is the normalization factor that ensures that Equation 2 is a true probability (will sum up to 1). The normalization factors are a function of the conditioned variables.

As shown in the above exemplary embodiment, in accordance with various exemplary aspects of this invention, the speech recognition system shown in FIGS. 1-4 models the posterior probability of linguistic units relevant to speech recognition using a log-linear model. As shown above, the posterior model captures the probability of the linguistic unit given the observed speech features and the parameters of the posterior model. Thus, the posterior model may be used to determine the probability of the word sequence hypotheses given a multitude of speech features.

It should be appreciated that the above representation is just an example, and that, according to the various aspects of the present invention, myriad variations may be applied. For example, the sequence $W_j^k$ need not be a word sequence, but can also be a sequence of phrases, syllables, phonemes, subphone units, and the like associated with the spoken sentence. Further, it is to be appreciated that the model of the various aspects of the present invention may therefore apply at different levels of linguistic hierarchy, and that the features $f_j$ may include many possibilities, including: synchronous and asynchronous, disjoint and overlapping, correlated and uncorrelated, segmental and suprasegmental, acoustic phonetic, hierarchical linguistic, meta-data, higher level knowledge, and the like.

By modeling in accordance to the various exemplary aspects of this invention, the speech features that are utilized may include asynchronous, overlapping, and statistically non-independent speech features.

In the various aspects of the present invention, a feature may be defined as a function f with the following properties:

$$f_{<b,w>}(\overline{c_i}, w_i) = \begin{cases} \alpha & b(\overline{c_i}) = 1 \land w = w_i \\ 0 & \text{otherwise} \end{cases} \quad (3)$$

where:
$\overline{c_i}$ denotes everything the probability is conditioned on, which may include context and observations,
b is a binary function expressing some property of the conditioned event, and w is the target (or predicted) state/unit such as a word, and
α is the weight of the function.

That is, a feature is a computable function that is conditioned upon context and observation, that may be thought of firing or becoming active for a specific context/observation and a specific prediction, for example, $w_i$.

It should be appreciated that the weight of the function α may be equal to 1 or 0, or may be real-valued. For example, in an exemplary embodiment, the weight α may be related to the confidence of whether the property was detected in the speech signal, or the importance of that property.

In accordance with various exemplary aspects of this invention, the lattice output from the decoder 322 may consist of more than one score. For example, scores may be obtained of the top predetermined number of matches. In addition, other data may be used by the search device 3226, including such information as the hidden Markov model scores obtained from a hidden Markov model decoder and scores for different match levels of Dynamic Time Warping, such as word vs syllable vs allophone.

An exemplary method of combining the different scores is to use a log-linear model and then train the parameters of the log-linear model.

For example, the log-linear model for the posterior probability of a path $H_i$ may be given by the exponent of the sum of a linear combination of the different scores:

$$P(H_i) = \exp\left(-\sum_{w \in H_i} \sum_j \alpha_j F_{wj}\right) / Z \quad (4)$$

where:
$F_{wj}$ is the $j^{th}$ score feature for the segment spanned by word w. for example, if the top 10 Dynamic Time Warping scores and the hidden Markov score obtained by various well known Dynamic Time Warping and hidden Markov model technologies (not explicitly shown in the figures) are returned, then there will be 11 score features for each word in the lattice.

Z is the normalization constant Z given by the sum over all paths ($H_1 \ldots _3$) of the exponential term:

$$Z = \sum_i \exp\left(-\sum_{w \in H_i} \sum_j \alpha_j F_{wj}\right)$$

that is needed to ensure that Equation (4) is a true probability, that is, sum to 1.

For the lattice generated on training data, the parameters $\alpha_j$ may be estimated by maximizing the likelihood of the correct path, that is, maximizing the probability of the hypothesis over all the training data.

It should be appreciated that the above embodiment is merely an exemplary embodiment, and that the above equation (4) may be revised by adding syllable and allophone features since a hierarchical segmentation is available. The weight parameters $\alpha_j$ can be have dependencies themselves. For example they could be a function of the length of the word or of the number of training samples for that word/syllable/phone/the like.

It should further be appreciated that equation (4) may further be generalized to having an exponent which is a weighted sum of general features, each of which is a function of the path $H_i$, and the acoustic observation sequence $o_i^T$.

Further, it should be appreciated that other features representing "non-verbal information" (such as whether test and training sequences are from the same gender, same speaker, same noise condition, same phonetic context, etc.) may also be included in this framework, and that the various exemplary aspects of this invention are not limited to the above described embodiments.

In other exemplary embodiments, the individual word scores $F_{wj}$ may themselves be taken to be posterior word probabilities from a log-linear model. The log-linear models may be calculated quite tractably even using lots of features. Examples of features are Dynamic Time Warping, hidden Markov model, and the like.

In accordance with the exemplary aspects of the present invention, log-linear models are used to make the best use of any given set of detected features, without the use of assumptions about features that are not present. That is, in contrast in contrast to other models such as the hidden Markov models which require using the same set of features in training and testing operations, the log-linear models make no assumptions about unobserved features, so that were some feature not observable due to noise masking, for example, the log-linear model will make the best use of the other available features.

In accordance with the exemplary aspects of this invention, the speech recognition system may make full use of the known models by training the known models with the log linear model, to obtain the first lattice, alignment, or decoding using the known models to combine with the log linear model of this invention.

In accordance with various exemplary embodiments of this invention, log-linear model is provided that utilizes among many possible features, the identities of the Gaussians that are the best match to traditional short time spectral features, in a traditional Gaussian mixture model comprising weighted combinations of Gaussian distributions of spectral features such as mel cepstra features, widely used in hidden Markov models, and matching of speech segments to a large corpus of training data.

In accordance with the various exemplary aspects of this invention, advantages such as not necessitating all features used in training to appear in testing/recognition operations, may be obtained. That is, with models other than log linear models, if features used for training does not appear in testing, a "mismatched condition" is obtained and performance is poor. Accordingly, usage of models other than a log linear model often results in failure if some features used in training are obscured by noise and are not present in the test data.

Figure 5:
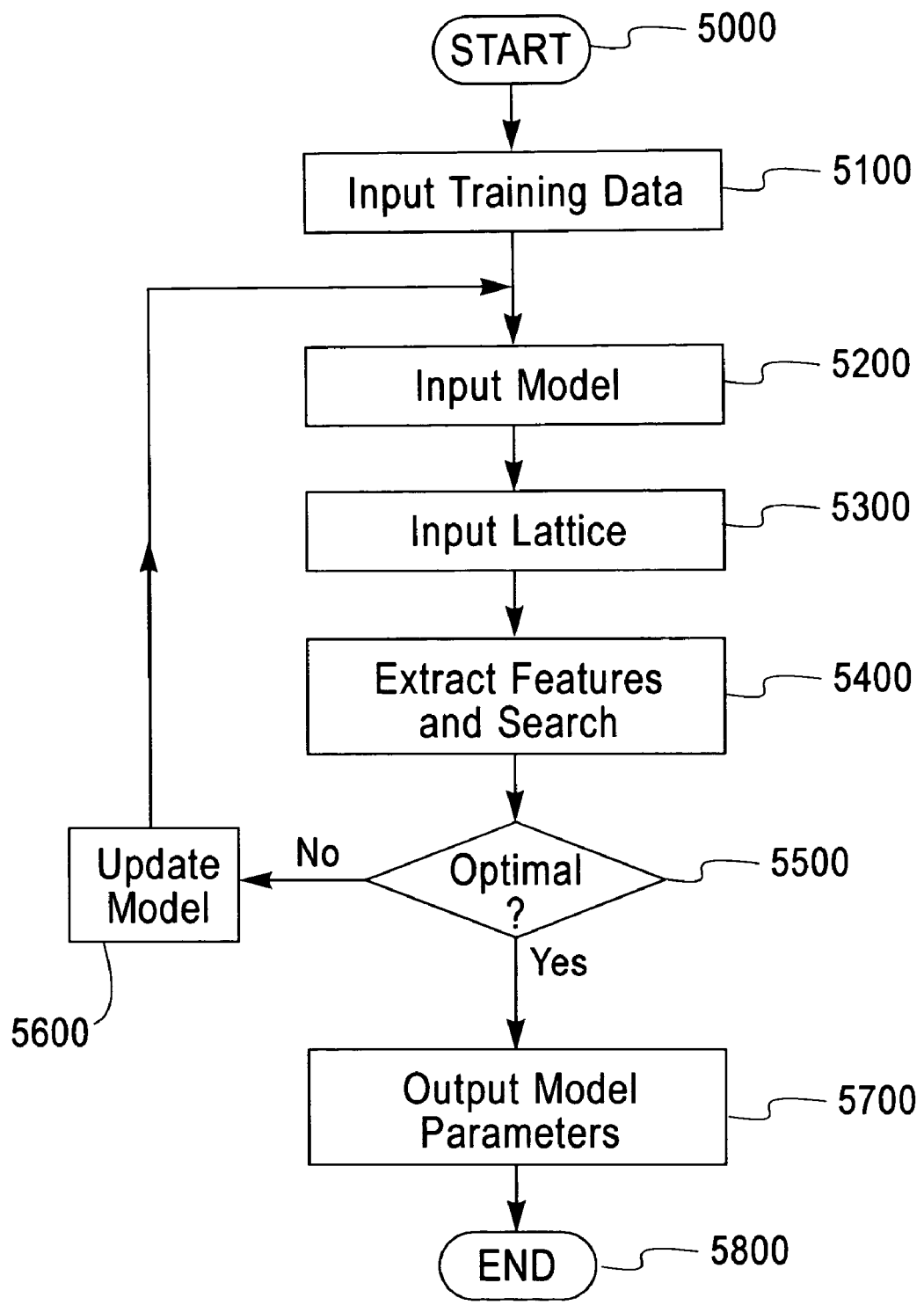
FIG. 5 shows a flowchart for data training in accordance with the exemplary aspects of the present invention.

FIG. 5 shows a flowchart of a method for data training according to the various exemplary aspects of the present invention. Beginning at step 5000, control proceeds to step 5100, where training data and meta-data are input to the decoder. This data contains the speech data typically collected and stored beforehand in the training storage, including the truth stored. It should be appreciated that meta data may include such information as speaker gender or identity, recording channel, personal profile of speaker, and the like. The truth may generally consist of the true word sequence transcription created by human transcribers. Next, in step 5200, a model is input to the decoder. This model is a general model stored beforehand in the model storage. Then in step 5300, a prestored lattice is input. Control then proceeds to step 5400.

In step 5400, a multitude of features are extracted and a search is performed. These features include those derived from traditional spectral features such as mel cepstra and time derivatives, acoustic phonetic or articulatory distinctive features such as voicing, place of articulation, and the like, scores from dynamic time warping match to speech segments, higher level information extracted from a particular word sequence hypothesis, for example, from a semantic or syntactic parse tree, the pragmatic or semantic coherence, and the like, speaking rate and channel condition, and the like. It should also be appreciated that some of the features extracted in this step may include log-linear or other models which will be updated in this process.

In this step, lattice with scores, objective functions and auxiliary statistics are determined using a log-linear function according to the various exemplary embodiments of this invention. It should be appreciated that a plurality of objective functions are calculated in this step due to the fact that a plurality of models are being trained in this process, that is, the log linear model giving the overall score as well as any other models used for feature extraction. The top level objective function is total posterior likelihood, which is to be maximized. It should be appreciated that there may be a plurality of types of objective functions for feature extractors. In various exemplary embodiments, these types of object functions include posterior likelihood, direct likelihood, distance, and the like.

In this step, different unit sequence hypotheses consistent with the true word sequence transcription, along with their corresponding time alignments are explored and the probabilities of partial and whole sequences are determined. The pruned combined results determine an updated lattice with scores.

It should be appreciated that, in accordance with the various exemplary aspects of this invention, the auxiliary statistics calculated in this step may include gradient functions, and other statistics required for optimization using an auxiliary function technique.

Next, in step 5500, it is determined if the objective functions are close enough to optimal. It should be appreciated that there are a plurality of tests for optimality, including thresholds on increase of objective functions or gradients. If optimality has not been reached, control continues to step 5600, where the models are updated and then control returns to step 5200. In step 5600, the models are updated using the auxiliary statistics. It is to be appreciated that there are a plurality of methods for updating the models, including but not limited to quasi-Newton gradient search, generalized iterative scaling, and extended Baum-Welch, and expectation maximization.

It should be also appreciated that efficient implementations may only update a subset of parameters in an iteration, and thus, in step 5400, only a restricted calculation need be performed. This restriction may include only updating a single feature extractor.

If optimality has been reached, control continues to step 5700, where the model parameters are output. Then, in step 5800, the process ends.

Figure 6:
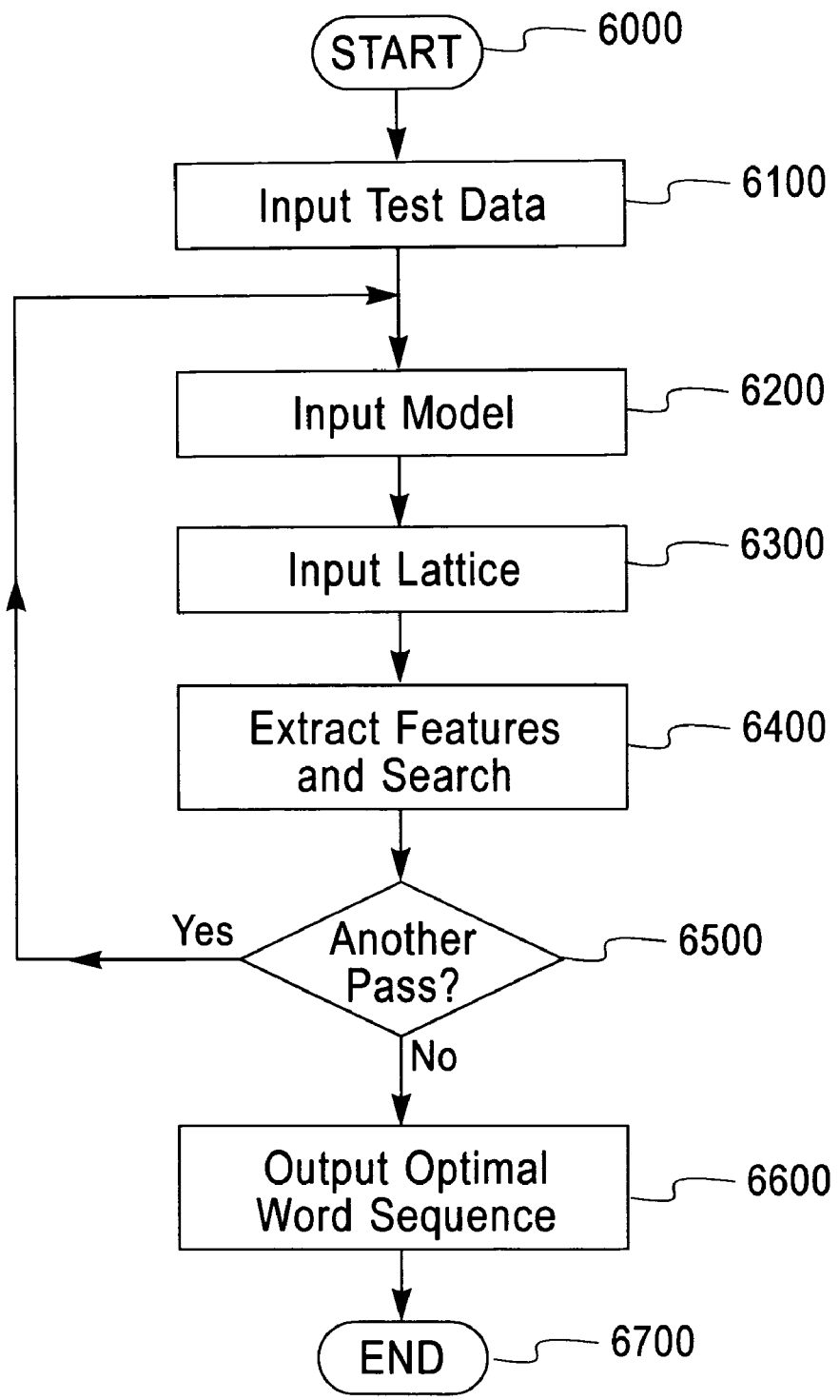
FIG. 6 shows a flowchart for speech recognition in accordance with the exemplary aspects of the present invention.

FIG. 6 shows a flowchart of a method for speech recognition according to the various exemplary aspects of the present invention. Beginning at step 6000, control proceeds to step 6100, where test data is input to the decoder. In accordance with the various exemplary embodiments of this invention, this test data is received from a user at a remote terminal via a telephone or data network or at a voice input device. This data may also include meta data such as speaker gender or identity, recording channel, personal profile of speaker, and the like. Next, in step 6200, the model is input. This model is stored in the model storage 327 during the training operation. Then, in step 6300, a prestored hypothesis lattice is input. Control then continues to step 6400.

In step 6400, a multitude of features are extracted and a search is performed using a log linear model of these features. These features include those derived from traditional spectral features. It should also be appreciated that some of the features extracted in this step may be determined using log-linear or other models.

In this step, different unit sequence hypotheses along with their corresponding time alignments are explored and the probabilities of partial and whole sequences are determined. It should be appreciated that this search in this step is constrained by the previous input lattice. The pruned combined results determine an updated lattice with scores. It should be appreciated that a particular embodiment of this updated lattice may be a single best most likely hypothesis.

Next, in step 6500, it is determined whether another pass is needed. If another pass is needed, then control returns to step 6200. It should be appreciated that the features and models used in subsequent passes may vary. The lattice output in step 6400 may be used as the input lattice in step 6300. Else, no additional pass is needed, and control continues to step 6600, where the optimal word sequence is output. That is, the word sequence corresponding the hypothesis in the lattice having the highest score is output. It should be appreciated that in an alternative embodiment, the lattice is output.

Control then continues to step 6700, where the process ends.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A speech recognition system, comprising:
a features extractor that extracts a multitude of speech features directly from input speech;
a log-linear function that receives the multitude of speech features obtained from the input speech and determines a posterior probability of each of a plurality of hypothesized linguistic units given the extracted multitude of speech features by applying the formula:

$$P(H_j | \text{features}) = P(w_1^k | o_1^T) = \prod_{i=1}^{k} P(w_i | w_1^{i-1}, o_1^T),$$

where:
$H_j$ is a jth hypothesis that contains a sequence of word (or other linguist unit) sequence $w_1^k = w1w2 \ldots wk$
i is an index pointing to the ith word (or unit)
k is a number of words (units) in the hypothesis
T is a length of the speech signal
$w_1^k$ is a sequence of words associated with the hypothesis $H_j$, and
$o_1^T$ is a sequence of acoustic observations,
with conditional probabilities represented by a maximum entropy log-linear model:

$$P(w_i | w_1^{i-1}, o_1^T) = \frac{e^{\sum_j \lambda_j f_j(w_i, w_1^{i-1}, o_1^T)}}{Z(w_1^{i-1}, o_1^T)},$$

where:
$\lambda_1$ are parameters of the log-linear model,
$f_1$ are a multitude of features extracted, and
Z is a normalization factor that ensures that Equation 2 is a true probability (will sum up to 1); and
a search device that analyzes the posterior probabilities determined by the log-linear function to determine a recognized output of unknown utterances.

2. The speech recognition system of claim 1, wherein the speech features comprise at least one of asynchronous, overlapping, and statistically non-independent speech features.

3. The speech recognition system of claim 1, wherein at least one of the speech features extracted is derived from incomplete data.

4. The speech recognition system of claim 1, further comprising a loopback.

5. The speech recognition system of claim 1, wherein the features are extracted using direct matching between test data and training data.

6. A speech recognition method, comprising:
extracting a multitude of speech features directly from input speech;
using a log linear function for determining a posterior probability of each of a plurality of hypothesized linguistic units given the extracted multitude of speech features by applying the formula:

$$P(H_j | \text{features}) = P(w_1^k | o_1^T) = \prod_{i=1}^{k} P(w_i | w_1^{i-1}, o_1^T),$$

where:

$H_j$ is a jth hypothesis that contains a sequence of word (or other linguist unit) sequence $w_1^k = w1w2\ldots wk$ i is an index pointing to the ith word (or unit)

k is a number of words (units) in the hypothesis

T is a length of the speech signal $w_1^k$ is a sequence of words associated with the hypothesis $H_j$, and $o_1^T$ is a sequence of acoustic observations, with the conditional probabilities represented by a maximum entropy log-linear model:

$$P(w_i \mid w_1^{i-1}, o_1^T) = \frac{e^{\sum_j \lambda_j f_j(w_i, w_1^{i-1}, o_1^T)}}{Z(w_1^{i-1}, o_1^T)},$$

where:

$\lambda_1$ are parameters of the log-linear model, $f_1$ are a multitude of features extracted, and Z is a normalization factor that ensures that Equation 2 is a true probability (will sum up to 1); and determining a recognized output of unknown utterances using the posterior probabilities.

7. The speech recognition method of claim 6, wherein the speech features comprise at least one of asynchronous, overlapping, and statistically non-independent speech features.

8. The speech recognition method of claim 6, wherein at least one of the speech features extracted is derived from incomplete data.

9. The speech recognition method of claim 6, further comprising a step of loopback.

10. The speech recognition method of claim 6, wherein the features are extracted using direct matching between test data and training data.

11. The speech recognition system of claim 1, wherein the features are extracted using Gaussian model identities at each time frame.

12. The speech recognition method of claim 6, wherein the extracting of a multitude of speech features comprises using Gaussian model identities at each time frame to identify and extract features.

* * * * *